(12) United States Patent
Hsu et al.

(10) Patent No.: US 6,373,158 B1
(45) Date of Patent: Apr. 16, 2002

(54) MOTOR MAIN SHAFT PROVIDED WITH FAST COOLING MEANS

(75) Inventors: Jih-Jong Hsu; Tsann-Huei Chang, both of Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/717,087

(22) Filed: Nov. 22, 2000

(30) Foreign Application Priority Data

Oct. 5, 2000 (TW) ...................................... 89217234 U

(51) Int. Cl.[7] ................................................. H02K 7/08
(52) U.S. Cl. ............................ 310/90; 310/52; 384/476
(58) Field of Search ............................. 310/90, 52, 59, 310/64; 384/476, 494

(56) References Cited

U.S. PATENT DOCUMENTS

| 5,139,349 | A | * | 8/1992 | Nakano et al. | .............. | 384/322 |
| 5,207,512 | A | * | 5/1993 | Grant et al. | ................ | 384/464 |
| 5,331,238 | A | * | 7/1994 | Johnsen | ........................ | 310/58 |
| 6,198,153 | B1 | * | 3/2001 | Bacumed et al. | .............. | 310/52 |

* cited by examiner

Primary Examiner—Nestor Ramirez
Assistant Examiner—Thanh Lam
(74) Attorney, Agent, or Firm—Browdy and Neimark

(57) ABSTRACT

A motor main shaft has a plurality of rolling bearings, a plurality of spacing rings, and a sleeve, which are all provided with a plurality of microfins to prevent the overheating of the main shaft in motion. The microfins serve to promote the heat convection.

6 Claims, 3 Drawing Sheets

MOTOR MAIN SHAFT PROVIDED WITH FAST COOLING MEANS

FIELD OF THE INVENTION

The present invention relates generally to a motor main shaft, and more particularly to a cooling means of the motor main shaft.

BACKGROUND OF THE INVENTION

The main shaft in high-speed motion generates a great deal of heat power resulting from the motion of a motor, the pre-compression friction of the bearings, and the heat stress caused by the uneven heat expansion of the bearings and the spacing rings. In light of the heat power, the head of the main shaft is apt to sway or expand. Such a deficiency may be overcome by enlarging the pre-compression value of the bearings. However, such remedy often results in the burnout of the bearings.

The conventional cooling means include refrigerator, coolants, variable pre-compression mechanism, and lubricant. The use of refrigerator is not only costly but also ineffective in view of the fact that the main shaft must be provided with a water jacket, and that the temperature and the quality of the cooling water can not be controlled with ease and precision, and further that the cooling is only superficially effective. The use of coolants requires the structural redesign of the main shaft such that a compressor or pump is called for. The application of a variable precompression mechanism is not cost-effective, due to the design complication of the mechanism. The lubricant is intended to reduce the mechanical friction to a limited extent and must be therefore used in conjunction with a cooling system.

SUMMARY OF THE INVENTION

The primary objective of the present invention is to provide a main shaft with a cooling means capable of cooling effectively and economically the main shaft in motion.

In keeping with the principle of the present invention, the foregoing objective of the present invention is attained by a main shaft which is provided with a plurality of bearings fitted thereover at an interval, and a plurality of spacing rings fitted thereover such that each of the spacing rings is located between two bearings. The spacing rings are provided with a plurality of cooling fins. The main shaft is further provided with a sleeve which is fitted over the bearings and the spacing rings.

DETAILED DESCRIPTION OF THE INVENTION

Figure 1:
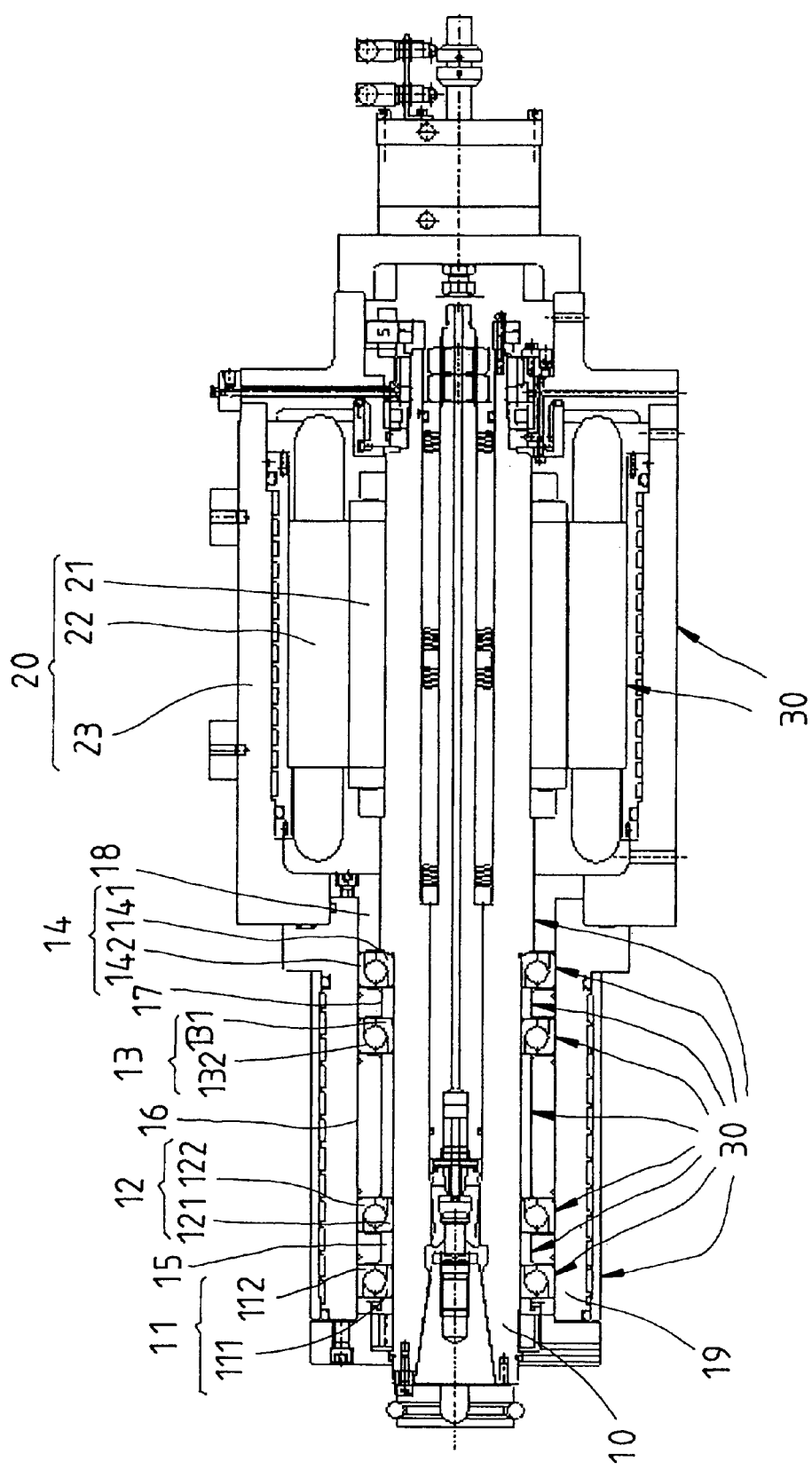
FIG. 1 shows a schematic view of a main shaft of a preferred embodiment of the present invention.

As shown in FIG. 1, a main shaft 10 embodied in the present invention is driven by a motor 20 and is provided with four rolling bearings 11, 12, 13 and 14, with each having an inner ring 111, 121, 131, 141, by which the bearings are fitted over the main shaft 10. The bearings are provided with a spacing ring 15, 16, 17, 18, which is located between two bearings for locating the bearings. The main shaft 10 is further provided with a sleeve 19 fitted thereover such that the inner side of the sleeve 19 is in contact with the outer rings 112, 122, 132, and 142 of the bearings. The motor 20 has a rotor 21 and a housing 23.

Figure 3:
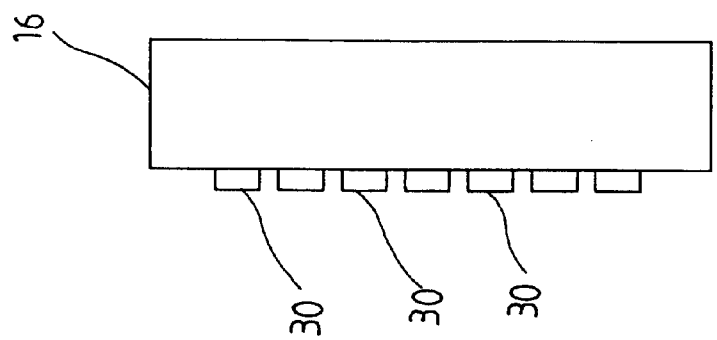
FIG. 3 is a side view of FIG. 2.
Figure 2:
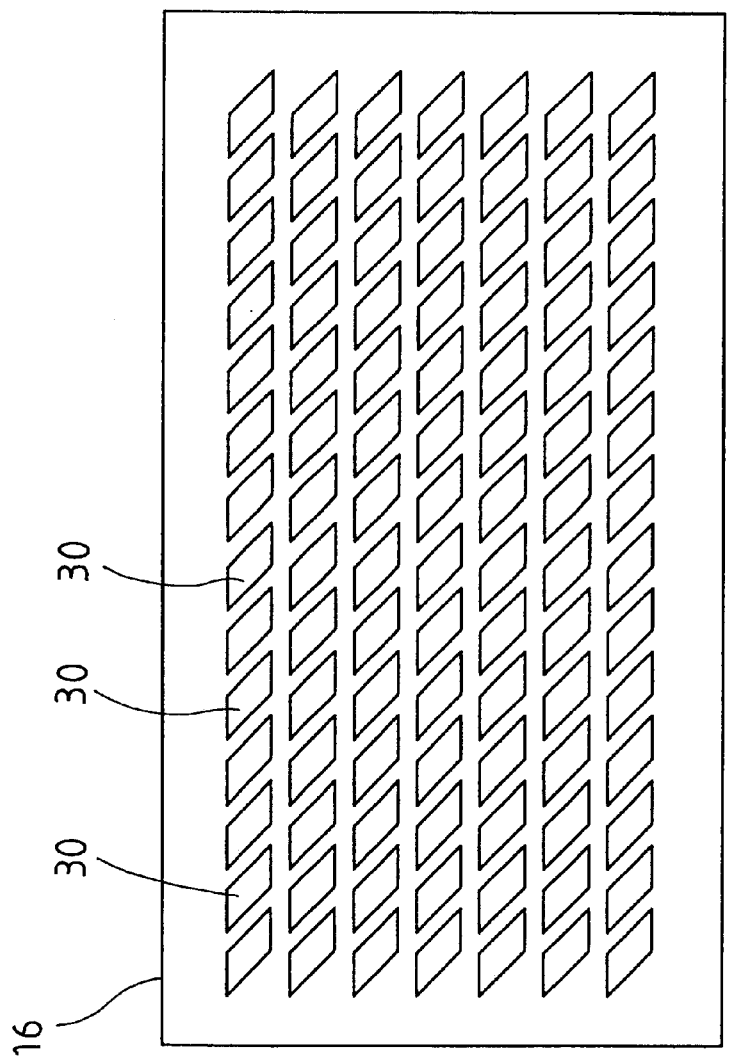
FIG. 2 shows an enlarged schematic view of the cooling fins of the preferred embodiment of the present invention.
Figure 4:
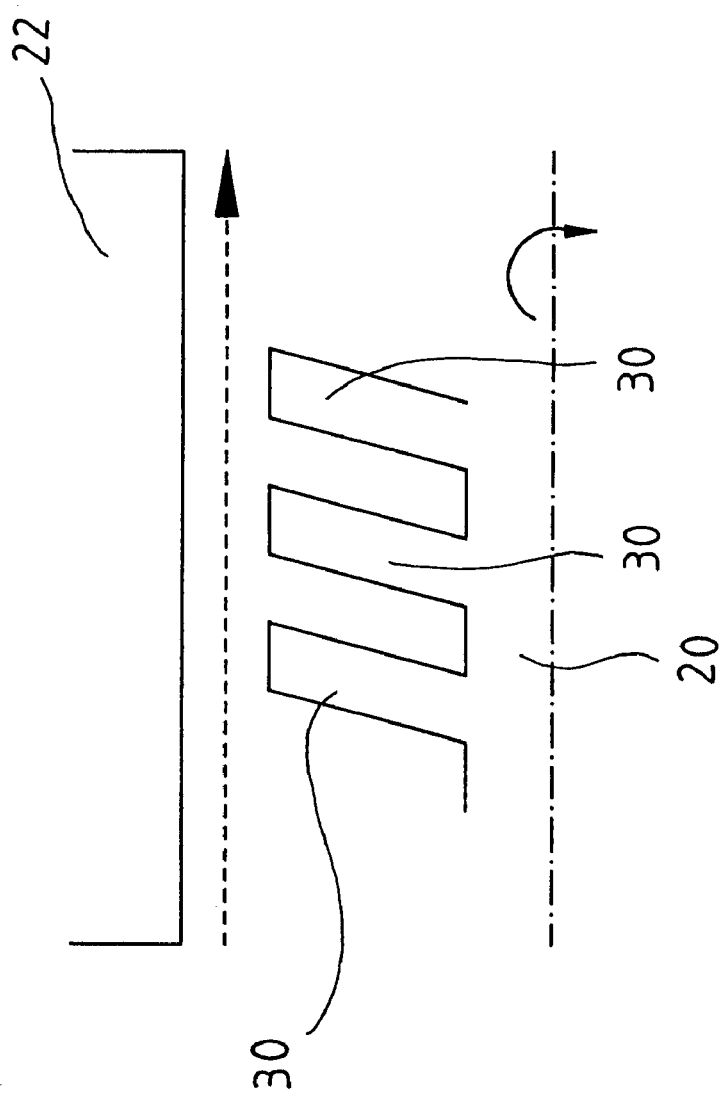
FIG. 4 shows a schematic view of air current generated by the cooling fins of the preferred embodiment of the present invention.

As shown in FIGS. 2 and 3, the bearings, the spacing rings, the sleeve, the motor and the housing are all provided in outer side thereof with a plurality of cooling microfins 30, which are made by LIGA and are intended to accelerate the cooling effect. If the width-depth ratio of the microfins 30 is 5, the cooling area increases about 20 times. In addition, the microfins 30 of the rotor 21 of the motor 20 bring about a microfan effect at the time when the motor 20 is in operation. The microfan effect reduces the overheating. In light of the microfan effect, the air flow between the rotor 21 and the stator 22 of the motor 20 accelerates, as shown in FIG. 4. As a result, the heat generated by the rotor 21 in motion is dispersed swiftly by convection. Similarly, the microfins 30 of the spacing rings 15, 16, 17 and 18 exhibit the microfan effect to enhance the efficiency of the heat convection.

The surfaces of the outer rings 112, 122, 132, and 142 of the bearings 11, 12, 13 and 14, the inner sides of the spacing rings 15, 16, 17 and 18, and the rotor 21 of the motor 20 are all provided with a high heat transfer coating by ionic implantation or sputtering. The heat transfer coating is formed of silver, copper, or copper-beryllium alloy which is five times greater in heat transfer than steel.

What is claimed is:

1. A motor main shaft comprising:
   a main shaft driven by a motor;
   a plurality of rolling bearings fitted over said main shaft at an interval;
   a plurality of spacing rings, with each being fitted over said main shaft such that said each spacing ring is located between two of said rolling bearings; and
   a sleeve fitted over said main shaft, said rolling bearings and said spacing rings;
   wherein said rolling bearings, said spacing rings and said sleeve are provided with a plurality of cooling microfins which are arranged at an interval.

2. The main shaft as defined in claim 1, wherein said microfins are made by LIGA.

3. The main shaft as defined in claim 1, wherein said rolling bearings and said spacing rings are coated with a high heat transfer layer by ionic implantation or sputtering.

4. The main shaft as defined in claim 3, wherein said high heat transfer layer is formed of silver.

5. The main shaft as defined in claim 3, wherein said high heat transfer layer is formed of copper.

6. The main shaft as defined in claim 3, wherein said high heat transfer layer is formed of copper-beryllium alloy.

* * * * *